United States Patent Office 3,586,694
Patented June 22, 1971

3,586,694
1-BENZOYLBENZIMIDAZOL-2-YLACETIC ACIDS
Tsung-Ying Shen, Westfield, and Alexander R. Matzuk, Colonia, N.J., and Harvey Schwam, Flushing, N.Y., assignors to Merck & Co., Inc., Rahway, N.J.
No Drawing. Continuation-in-part of application Ser. No. 598,607, Dec. 2, 1966. This appliccation Oct. 18, 1968, Ser. No. 768,884
Int. Cl. C07d *49/38*
U.S. Cl. 260—309.2                     5 Claims

ABSTRACT OF THE DISCLOSURE

New 1-benzoylbenzimidazol-2-ylacetic acids are prepared which exhibit anti-inflammatory properties.

This application is a continuation-in-part of U.S. application Ser. No. 598,607, filed Dec. 2, 1966, now abandoned.

This invention relates to new chemical compounds. More particularly, it relates to a new class of compounds of the benzimidazole series. Still more particularly, it is concerned with benzimidazoles substituted at the 2-position with an acetic acid, and further substituted at the 1-position with an aromatic or heteroaromatic group of less than three fused rings. The invention also relates to salts, amides, anhydrides, and esters of such compounds. The invention also relates to the process by which these valuable compounds may be prepared, and to novel intermediates used in said process.

The new benzimidazole compounds of the invention may be represented by the general structural formula

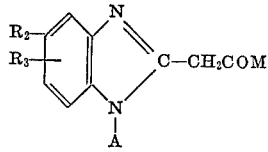

in which

A is a substituted or unsubstituted aralkyl, heteroaralkyl, aroyl or heteroaroyl radical including, for example, a benzyl or benzoyl group or substituted derivatives thereof, or those in which the heteroaromatic radicals are such as furyl, isonicotinyl, thienyl, pyrryl, thiazolyl, thiadiazolyl, pyrazinyl, pyridinyl, quinolyl, isoquinolyl, pyrazolyl, imidazolyl, oxazolyl, pyrimidinyl, or a benz derivative thereof such as benziso-oxazolyl, benzimidazolyl, benzofuranyl, benzothiazolyl, benzotriazolyl, benzoxazolyl, benzothienyl, indazolyl and isoindazolyl;

$R_2$ is hydrogen, hydroxy, lower alkyl, lower alkoxy, nitro, amino, lower alkylamino, di(lower alkyl)amino, lower alkanoylamino, lower alkanoyl, bis(hydroxy lower alkyl)amino, 1-pyrrolidino, 4-methyl-1-piperazinyl, 4-morpholinyl, cyano, trifluoromethyl, halogen, di(lower alkyl)sulfamyl, benzylthio, amino lower alkyl, trifluoromethylthio, benzyloxy, lower alkenyl, lower alkenyloxy, 1-azacyclopropyl, cyclopropyl, cyclopropyl(lower alkoxy) and cyclobutyl(lower alkoxy); the lower alkenyl and alkyl groups containing up to six carbon atoms;

$R_3$ is hydrogen, halogen, trifluoromethyl, a lower alkyl radical containing, for example, up to six carbon atoms such as methyl, ethyl, isobutyl or hexyl, or a lower alkoxy radical containing, for example, up to six carbon atoms such as methoxy, isopropoxy, butoxy and pentoxy;

M is $R_4$ or $R_5$, $R_4$ being amino, methylamino, ethylamino, propylamino, butylamino, dimethylamino, diethylamino, methylethylamino, methylbutylamino, dibutylamino, glucosamino, glycosylamino, allylamino, phenethylamino, N-ethylphenethylamino, β-hydroxyethylamino, 1-ethyl-2-aminomethyl piperidino, tetrahydrofurfurylamino, 1,2,5,6-tetrahydropyridino, morpholino, N-methyl piperazino, piperazino, N-phenylpiperazino, piperidino, benzylamino, anilino, cyclohexylamino, pyrrolidino, N-hydroxyethylpiperazino, sodium-β-sulfoethylamino, N,N-dimethylcarboxamidomethylamino, N,N-diethylaminoethylamino, p-methoxyanilino, and 1-methyl-2-aminomethyl pyrrolidino, $R_5$ being hydroxyl or a hydrocarbonoxy group including lower alkoxy, benzyloxy, phenoxy, ethoxyethoxy, diphenylmethoxy, triphenylmethoxy, cyclopropoxy, β-diethylaminoethoxy, β-dimethylaminoethoxy, β-acetaminoethoxy, phenethoxy, allyloxy, isopropoxy, cyclopropylmethoxy, tetrahydrofurfuryloxy, cyclohexyloxy, cyclopentyloxy, cyclopropylethoxy, p-acetaminophenoxy, o-carboxyphenoxy, polyhydroxy lower alkyl such as glycerol, polyhydroxy cycloalkyl such as inositol and 1,4-cyclohexanediol, polyalkoxy lower alkyl such as the polyalkyl ethers derived from sorbitol, mannitol or other sugar alcohols containing up to six carbon atoms in the basic chain, and compounds where $R_5$ is a cyclic lower alkylamino lower alkyl radical derived from N-(β-hydroxyethyl)piperidine, N-(β-hydroxyethyl)pyrrolidine, N-(β-hydroxyethyl)morpholine, N-methyl-2-hydroxymethyl pyrrolidine, N-methyl-2-hydroxymethyl piperidine, N-ethyl-3-hydroxy piperidine, 3-hydroxyquinuclidine and N-(β-hydroxyethyl)-N-methyl piperazine.

M also includes OZ, where Z is a cation including metals such as alkali or alkaline earth metals, or OY where Y is acyl, including lower alkanoyl, aroyl, aralkanoyl or a group of the formula

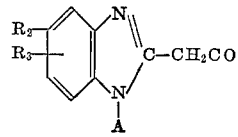

wherein A, $R_2$ and $R_3$ are as defined above.

Further, the new intermediate compounds of this invention may be represented by the following formula

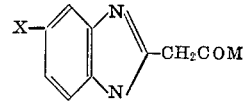

wherein X may be halogen, trifluoromethyl, lower alkoxy, lower alkyl, nitro and lower dialkylamino; and M is as previously defined.

It has been found that benzimidazole compounds substituted as described above possess a useful degree of anti-inflammatory activity and also exhibit anti-pyretic and analgesic activity. They are further of value in the treatment of arthritic and dermatological disorders and in like conditions which are responsive to treatment with anti-inflammatory agents. For these purposes, they are normally administered orally in tablets or capsules, the optimum dosage depending, of course, on the particular compound being used and the type and severity of the condition being treated. Although the optimum quantities of the compounds of this invention to be used in such manner will depend on the compound employed and the particular type of disease condition treated, oral dose levels of preferred compounds in the range of 10–2,000 mg. per day are useful in control of arthritic conditions, depending on the activity of the specific compound and the reaction sensitivity of the patient.

Various tests in animals can be carried out to show the ability of compounds of this invention to exhibit reactions that can be correlated with anti-inflammatory activity in humans.

One such test, the Carrageenin test, is used to show the ability of compounds to inhibit edema induced by injection of an inflammatory agent into the tissues of the foot of a rat against non-inflamed controls. This Carrageenin testing method is known to correlate well with anti-inflammatory activity in humans and is a standard test used to determine anti-inflammatory activities. This correlation has been shown by the activities of compounds known to be clinically active, including Indocin, Aspirin, Butazolidin, Tandearil, Cortone, Hydrocortone and Decadron. In view of the results of this test, the instant compounds can be considered to be active anti-inflammatory agents.

A further test also shows the ability of compounds to inhibit edema in the Adjuvant arthritis test. This testing method is also known to correlate with anti-inflammatory activity in humans. This test also indicates that the instant compounds can be considered active anti-inflammatory agents.

In addition to their pharmacological activity, the acid products of this invention are useful as intermediates in preparing the ester and amide derivatives described and claimed herein. The said esters and amides also exhibit anti-inflammatory activity and, therefore, are useful in the treatment of these disorders.

The esters, salts, anhydrides and amides of the acetic acids represent an additional aspect of the invention. In some cases, the esters are intermediates in the synthesis of the free acids and are often themselves of importance as end-products. The preferred esters are the lower alkyl and aralkyl esters such as methyl, ethyl, propyl, t-butyl, benzyl and like esters. The salts, anhydrides and amides of these compounds can be prepared by treating the benzimidazole acetic acid or ester with appropriate reagents or compounds to produce the desired derivative.

The following compounds are representative of those contemplated by this invention. These and others may be prepared by the procedures discussed hereinbelow:

α-[1-(p-chlorobenzyl)-5-methoxy-2-benzimidazolyl] acetic acid;
methyl-α-[1-(p-trifluoroacetylbenzoyl)-5-dimethyl-amino-2-benzimidazolyl]acetate;
1-benzoyl-5-chloro-2-(4-methylpiperazinocarbonyl-methyl)benzimidazole;
α-[1-(p-chlorobenzoyl)-5-methoxy-2-benzimidazolyl] acetic anhydride;
β-acetaminoethyl-α-[1-(N,N-dimethyl-p-sulfonamido-benzyl)-5-allyloxy-2-benzimidazolyl]acetate;
N-(β-diethylaminoethyl)-α-[1-(2-thenoyl)-5-methoxy-2-benzimidazolyl]acetamide;
allyl α-[1-(p-methylsulfinylbenzyl)-5-acetamido-2-benzimidazolyl]acetate.

A feature of these compounds is the presence of an aralkyl, aroyl, heteroaryl, heteroaralkyl or heteroaroyl radical attached to the 1-position of the benzimidazole nucleus. These groups may be further substituted in the aromatic ring with hydrocarbon radicals such as lower alkyl, or with functional substituents such as hydroxy or an etherified hydroxy (hydrocarbonoxy) group such as a lower alkoxy, e.g., methoxy, ethoxy, isopropoxy, allyloxy, propoxy, lower alkanoyloxy; an aryloxy or aralkoxy group, e.g., phenoxy, benzyloxy and the like. It may be a nitro radical; a halogen such as chlorine, bromine, iodine or fluorine; an amino group or a substituted amino group, representative examples of which are acylamino, amine oxide, ketimines, urethanes, lower alkylamino, lower dialkylamino, lower alkanoylamino, amidine, acylated amidines, hydrazine or a substituted hydrazine, alkoxyamines and sulfonated amines. Further, it may be a mercapto or a substituted mercapto radical of the type exemplified by alkylthio groups such as methylthio, ethylthio, and propylthio and aralkylthio or arylthio groups, e.g., benzylthio and phenylthio. The aryl moiety of the radical may, if desired, be haloalkylated, as with a trifluoromethyl, trifluoroethyl, perfluoroethyl, β-chloroethyl or like substituent, acylated as with lower alkanoyl such as acetyl or propionyl, benzoyl, phenylacetyl, halogenoacetyl, trifluoroacetyl, diloweralkylaminoacetyl and like acyl groups, or it may contain a haloalkoxy or haloalkylthio substituent. In addition, the invention embraces compounds wherein the aryl moiety contains a sulfamyl, benzylthiomethyl, cyano, sulfonamido, lower alkylsulfinyl, lower alkylsulfonyl or dialkylsulfonamido radical, amino lower alkyl and di(lower alkyl)amino lower alkyl. Further, it may contain a carboxy substituent, or a derivative thereof, such as an alkali metal salt, di(lower alkyl)carboxamido, amido, azido, or a lower alkyl ester of the carboxy radical or an aldehyde derivative of the type represented by acetals or thioacetals. In the preferred compounds, this aromatic radical is benzyl and the functional substituent is in the para position of the six-membered ring.

The most preferred compounds of this invention are those represented by the general formula where A is p-substituted benzyl or benzoyl (the halo substituent being most preferred), M is hydroxy, lower alkoxy, benzyloxy and amino, and $R_2$ is lower alkoxy, halo, nitro and di(lower alkyl)amino and $R_3$ is hydrogen.

It has been observed that when this aromatic group is an aroyl or heteroaroyl radical attached to a nitrogen of the benzimidazole, it is easily hydrolyzed under conditions normally employed for saponification of an ester of the invention to the corresponding free acid. For this reason, care must be taken in attempting such conversion. One convenient method comprises acylation of the benzyl ester and subsequent hydrogenolytic removal of the benzyl group. Alternatively, other esters such as the t-butyl esters, which are amenable to selective removal by other treatment, such as heating above 210° C. or by treatment at 25°–110° C. with a catalytic amount of an aryl sulfonic acid or other like acids, may be utilized.

A presently preferred process of synthesizing the subject benzimidazole acetic acids and derivatives comprises reacting an o-phenylenediamine with a reagent which will produce a benzimidazole in which the carbon of the heterocyclic ring is substituted with the desired group or with a group which may be converted to the desired substituent and thereafter substituting the additional substituent to produce a compound of the invention. Flow Sheet I shows the sequence for the preparation of such compounds.

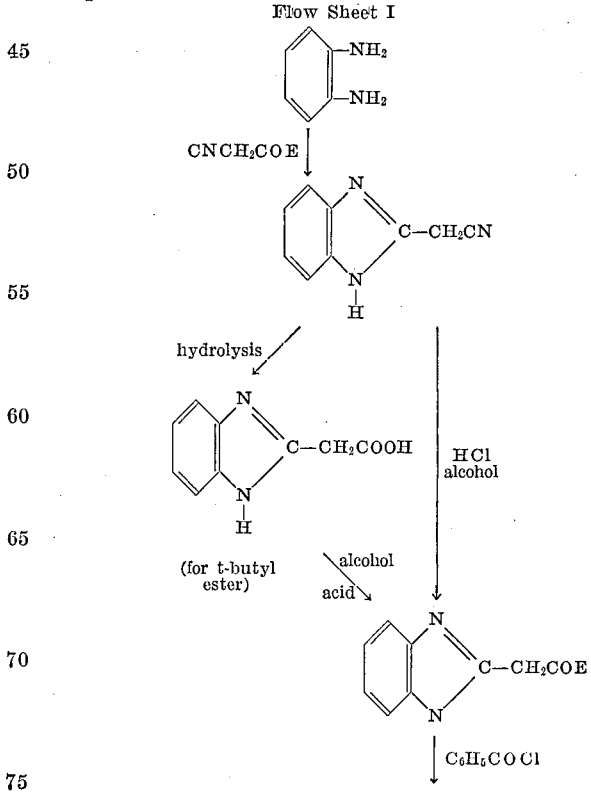

Flow Sheet I

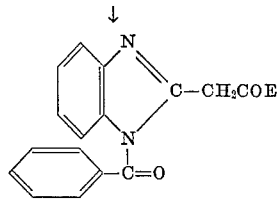

E = a lower alkoxy, aryloxy or aralkoxy group, suitably methoxy, ethoxy, t-butoxy or benzyloxy. The product is an α-(1-benzoyl-2-benzimidazolyl)acetate.

In accordance with Flow Sheet I, an o-phenylenediamine is reacted with an α-cyano acetic acid or an ester thereof to produce a benzimidazole with an α-cyano alkylene substituent on the 2-position. This first step is accomplished in a reaction inert solvent or, in a preferred method, excess ester or acid is utilized as the solvent. In any event, it is most advantageous to have an excess of the theoretical requirement of the cyano reagent present to insure a good product yield. The reaction is maintained at a temperature of from about 100° C. to about 250° C., preferably by refluxing at the boiling point of the mixture, for a period of from about one to about five hours. The nitrile may be isolated by precipitating it from the reaction mixture (suitably by adding a reagent in which it is insoluble), or by chromatography.

In the next step, this 2-benzimidazolyl nitrile is hydrolyzed to the corresponding acid with a suitable hydrolyzing agent. In a preferred procedure a lower alkyl ester is produced directly by reaction with a mineral acid such as hydrochloric or sulfuric, in a lower alkanol solvent. The temperature of the reaction (whether for the production of an acid or the direct preparation of an ester) is maintained between 60° and 210° C., conveniently at the reflux temperature of the mixture for a period from about 1 to about 6 hours. For the preparation of t-butyl esters, it is preferable to obtain the free acid first by hydrolysis of the nitrile. The acid is then converted to the t-butyl ester by treatment wtih t-butanol and an acid.

It is preferred to prepare and utilize benzimidazolyl esters since they are less reactive than acids and may therefore be employed in subsequent steps of the synthesis with less danger of side reactions.

The ester is then acylated to produce a 1-acyl-2-benzimidazolyl acetic acid ester. Acylation is preferably conducted by treating the compound obtained in the previous step with a reagent which will replace a reactive hydrogen at the 1-position with a radical or ion readily reactive with the selected acylating agent. One convenient method for accomplishing this is to treat the ester with a basic solution of silver nitrate to precipitate the silver salt of the starting benzimidazole ester. This salt is then reacted with the selected aroyl or heteroaroyl halide in an anhydrous solvent medium, suitably a non-polar solvent such as benzene, toluene or xylene. The reaction is carried out at temperatures between 75° and 200° C., most conveniently at the reflux temperature of the mixture.

Alternatively, this step may be carried out by treating the ester with an alkali metal hydride such as sodium hydried, to form a sodium derivative, which is reacted with the selected acid halide. In this method, room temperature, i.e., 20° to 30° C., is preferred although lower temperatures, even as low as 0° C., may be employed to minimize side reactions.

When 1-acyl-2-benzimidazolyl acetic acids of this invention are desired, the hydrolysis of these esters must be carried out only by means of reactions which will not affect the acyl group at the 1-position, as indicated heretofore.

The o-phenylenediamine compounds used as starting compounds for the synthesis of the compounds of this invention are known reagents. The benzene ring may carry, in addition to the two amino groups, from 1 to 2 substituents of a number of types, preferably alkyl, alk- oxy, nitrogen, and sulfur derivatives, with the 4-position of the benzene ring preferably so substituted.

It will be recognized that position isomers of the compounds of the invention heretofore described are possible because the reaction taking place at the nitrogen of the imidazole ring may cause substitution of the 1 or the 3-position of the nucleus, since the cyclization reaction produces 2 isomeric formulae which may be shown thus:

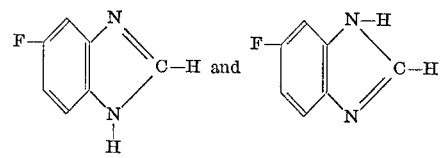

Both of these compounds will produce substituted products at the nitrogen with the replaceable hydrogen and yield a combination of the 5 and 6 fluoro isomers of the products. These may be separated and isolated by chromatography or any other technique which lends itself to the resolution of isomers of this type. In the interests of simplicity we will show only 1 isomer as the product of reactions involving this structure in the example and discussion given hereafter. Thus, when a 4-methyl compound of the invention is prepared, the isomeric 7-methyl product also synthesized will not be shown. Of course, in the special case where there is no substituent on the benzenoid ring, only one product is formed.

When a product similar to that produced by the sequence in Flow Sheet I, but having an aryl, aralkyl, heteroaryl or heteroaralkyl group at the 1-position is desired, the synthesis is preferably performed by starting with an o-nitraliline instead of a diphenylamine. The former compound is used because it enables a reaction substituting an aryl or aralkyl radical in the amino group to take place before the benzimidazole nucleus is formed. This N-substituted nitraniline is then reduced to an N-aryl substituted diphenylamine which is then cyclized by means of a reagent which will produce an acetic acid residue on the 2-position of the imidazole. Flow Sheet II shows the synthesis of N-(p-chlorobenzyl)-4 - trifluoromethyl - o-phenylenediamine, an intermediate which may then be cyclized, as shown hereafter.

Flow Sheet II

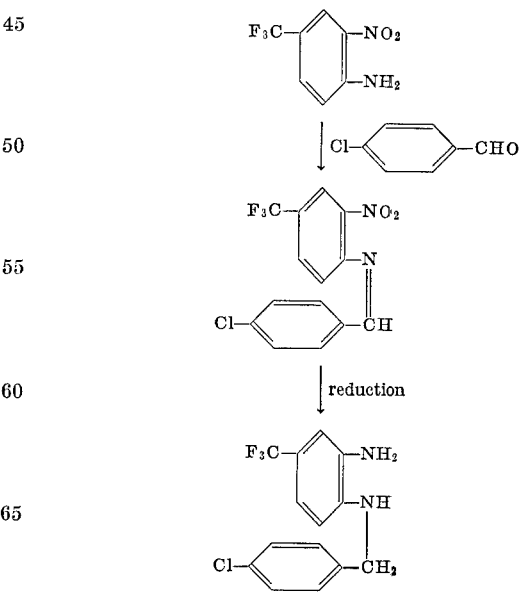

The o-nitranilines used as starting materials for the reaction sequence of Flow Sheet II are readily available via known procedures. The selected starting compound is reacted with an aromatic aldehyde in a reaction inert solvent or without a solvent if the mixture is liquid at the reaction temperature, for a period of from about one to about four hours. This condensation reaction is effected at temperatures from about 30° to about 120° C., with the higher temperatures preferred (80° to 120° C.) to insure as complete a reaction as possible. Equimolar quantities of the reactants prevent undue contamination of the finished product with unreacted reagents.

In the reduction step which follows, an N-substituted o-phenylenediamine is produced. This reaction is preferably conducted by hydrogenation, in a reaction inert solvent such as an alcohol or ether, with the conditions carefully controlled so that only four moles of hydrogen are absorbed. Temperatures from 10° to 90° are suitable for the reduction, but a range from about 20° to about 50° is preferred for ease of reaction control. An inert catalyst, suitably Raney nickel, is preferably present in amounts ranging from about 2% to about 20% of the weight of hydrogen acceptor. The reduced compound may be isolated in any appropriate manner, suitably filtering off the catalyst and evaporating the solvent. Alternatively, the Schiff's base may be reduced with a metal hydride such as sodium borohydride in an inert solvent such as isopropanol, methanol or dimethoxyethane at 0° to 30° C., with or without the presence of a buffering agent such as carbon dioxide.

This o-phenylenediamine can also be produced from a nitraniline by a reaction which replaces only one of the amino hydrogens with the selected aralkyl group, followed by the intermediate. The preparation of N-(p-methoxy benzyl) - 4 - methoxy-o-phenylenediamine is illustrative:

Flow Sheet III

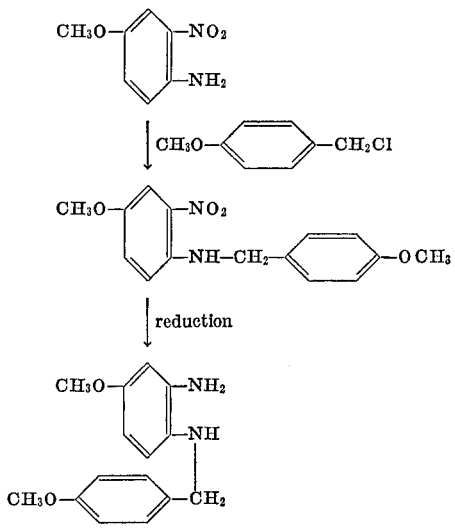

In this alternative sequence, the nitraniline starting material is treated with an aralkyl halide, preferably the chloride, to produce the corresponding N-monosubstituted aniline. The reaction mixture is heated from a temperature of about 90° to about 250° C. for a period of about 3 hours to about 24 hours. Reaction is facilitated by the presence of a catalyst, suitably iodine or iodide salt; a slight excess (to about 10%) of the halide reactant improves yields.

The reduction step now required is preferably carried out via a hydrogenation procedure identical to that discussed above concerning the methylidene reaction and that methylidene compound in Flow Sheet II except only three moles of hydrogen is required to effect the conversion.

Where the $R_2$ and/or $R_3$ substituents present are such that they substantially diminish the nucleophilicity of the corresponding nitraniline derivative, it is possible to obtain the desired intermediate by using a corresponding o-halonitrobenzene and reacting it with an amine bearing the substituent desired at the 2-position of the final compound, the preparation of such an intermediate and its subsequent reduction are illustrated in Flow Sheet IV. Sheet IV.

Flow Sheet IV

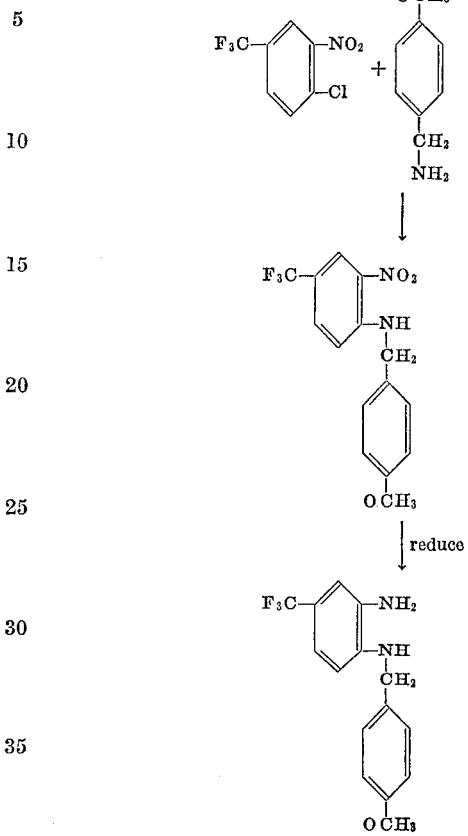

Which ever procedure is used, the product of these reactions is a mono-substituted diphenylenediamine. It will be recognized that this intermediate can also be described as a 1-aralkyl-amino-2-amino-N-substituted benzene in order to identify the amino group which has been substituted with particularity. This additional method of identification has been used in the examples following, when any difficulty concerning substituent location has been anticipated.

This substituted diphenylenediamine, synthesized by one of the above described methods, is then converted to a compound of the invention. In a preferred procedure, the diamines are treated with an α-cyano acetic acid ester to give a N,N-disubstituted diphenylenediamine nitrile.

This reaction and the subsequent cyclization step may be shown in the reaction sequence of Flow Sheet V which shows the production of α-[1-(p-chlorobenzyl)-2-benzimidazolyl-4-trifluoromethyl]acetic acid.

Flow Sheet V

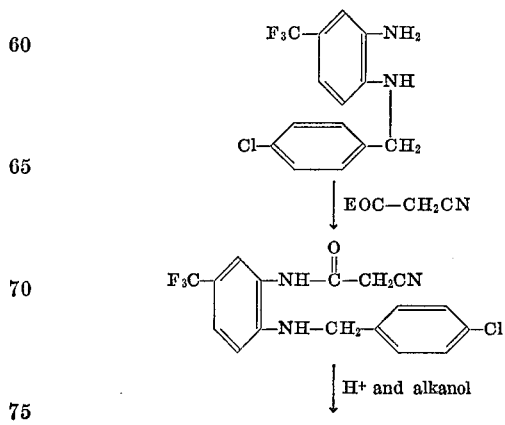

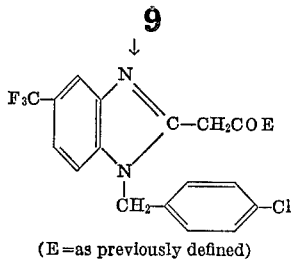

(E = as previously defined)

For the first step, a reaction inert solvent such as an ether may be used, but in the preferred method, the cyano ester served as a carrier for the reaction which is allowed to proceed at from 1 to about 6 hours at a temperature of from about 100° to about 225° C. Refluxing the mixture at its boiling point is a most convenient method of temperature control. It is advantageous to have a molar excess of the cyano material present to obtain as complete a reaction as possible. This intermediate is then isolated in any suitable manner, such as precipitation via the use of a solvent in which it is insoluble and separation by filtration.

This nitrile is then cyclized and converted to a benzimidazole with an acetic acid residue on the 2-position in a one-step reaction. In the preferred method, a mineral acid in a lower alkanol such as methanol, ethanol or butanol is used. The reaction is maintained at a temperature of from about 60° to about 175° C., preferably by refluxing at the boiling point of the reaction mixture for a period of about 1 to about 8 hours. An ester of the invention is thus produced. It may be isolated by first removing any alkanol from the reaction mixture and extracting the mixture with a solvent for the ester, which latter is removed to obtain the desired compound.

If an α-(1-aralkyl-2-benzimidazolyl)acetic acid is sought, the ester produced by the process described above is hydrolyzed to ts corresponding acid with alkali for example, by treatment with an alcoholic sodium hydroxide, with or without heat, in a standard hydrolysis procedure. The desired product is isolated by neutralizing that reaction mixture with acid and separating and drying the resulting precipitate. The acid obtained by this method is an α-(1-aralkyl-2-benzimidazolyl)acetic compound.

If the desired compound of the invention is an ester, it may be prepared directly as, e.g., via the procedure of Flow Sheet I, or an acid prepared by the procedure described above can be esterified thereafter. This may be accomplished by any suitable esterification procedure, such as by reaction of the ester with the selected alkanol in the presence of a mineral acid such as sulfuric acid or hydrogen chloride. After formation, the ester is isolated by any suitable procedure, such as extraction by a solvent for the ester, followed by removal of that solvent.

In addition to the acids and esters, other derivatives of the compounds of the invention may also be prepared, as was indicated heretofore. For example, the acid compound of this invention may be converted to the corresponding amide by reaction with ammonia or primary or secondary amines, via the corresponding anhydride, mixed anhydride or ester, in the usual manner. A slight excess of the amine is used as one method of obtaining good yields, and a temperature range of from about 15° to 50° is preferred although a wider range of from 10° to 80° may be used for a reaction period of from about 30 minutes to about 6 hours.

Metallic salts and organic ammonium salts of the acid compounds can also be formed by reacting the acid compound with an appropriate base. These salt-forming reactions are preferably carried out with an excess of the basic reagent present to increase yields, at temperatures from about −10° to about 50° C. for periods of from about ten minutes to about 2 hours.

Anhydrides of the acids represent an additional aspect of the invention. The symmetrical anhydride is prepared by intermolecular dehydration of the acid, accomplished by the use of a mild dehydrating agent, dicyclohexylcarbodiimide being the most suitable. A mixed anhydride is formed by reaction of a nonhydroxylic base such as a tertiary alkylamine, pyridine and the like on the acid, followed by treatment of this acid salt with an acid halide such as an alkyl or aryl chloroformate, phosphorous oxychloride, thionyl chloride or similar reagent.

Anhydride synthesis is carried out on those acids of the invention which have no active OH, SH or NH group. Thus, for example, if a primary or secondary amino group is substituted on the 5-position of the nucleus, the group must first be protected before attempting to produce an anhydride.

The synthesis of various compounds of this invention having a 5-substituent with a nitrogen attached to the homocyclic ring of the benzimidazole is generally based upon the 5-nitro compound, which is transformed into the desired 5-substituent. Such transformation can be carried out in a number of ways. Reduction of the 5-nitro group gives a 5-amino group, reaction of the amino with alkyl halides gives mono and dialkyl amino groups. If the alkyl halide is a dihaloalkylene group (e.g., 1,4-dibromobutane) a heterocyclic ring (e.g., pyrrolidino) is formed. Similarly, bis(β-chloroethyl)ether will give an N-morpholino compound. Alkylation can also be carried out simultaneously with reduction, as e.g., formaldehyde, Raney nickel and hydrogen. Acylation can be carried out on the 5-amino compound or on the 5-nitro (with simultaneous reduction) to give 5-acylamido compounds. The 5-amino group can be reacted with isocyanates to give 5-ureido compounds.

The procedures outlined heretofore can be altered somewhat without departing from the spirit and scope of this invention. Each one of the procedures is not necessarily applicable to the preparation of all the compounds within the scope of the invention. Problems arising in the synthesis may be obviated by appropriate selection of the order in which reactions are performed, or by the use of blocking groups in accordance with standard practices.

The following examples are used for purposes of illustration and should not be considered as limiting the invention.

EXAMPLE 1

Methyl α-(5-methyl-2-benzimidazolyl)acetate (A) 5-methyl-2-cyanomethylbenzimidazole: A mixture of 4-methyl-o-phenylenediamine (0.1 mole) and 0.15 mole of ethyl cyanoacetate is refluxed for two hours and cooled to room temperature overnight. Ether is added to the mixture and the solid is filtered and washed with more ether to yield 5-methyl-2-cyanomethylbenzimidazole.

(B) Methyl α-(5-methyl-2-benzimidazolyl)acetate: The product of Part A (0.03 mole) is added to 75 ml. of a 9% methanolic hydrogen chloride solution and the mixture is refluxed 2 hours, filtered and evaporated in vacuo. The residue is distributed between 50 ml. of a 10% sodium bicarbonate solution and 50 ml. of chloroform, the chloroform layer is dried with solid anhydrous sodium carbonate and evaporated to dryness in vacuo to produce methyl α-(5-methyl-2-benzimidazolyl)acetate.

(C) Similarly, other 2-benzimidazolyl esters are prepared using other known phenylenediamine compounds such as 4-fluoro-o-phenylenediamine, 4-nitro-o-phenylenediamine, 4-methoxy-o-phenylenediamine, 4-phenyl-o-phenylenediamine, 4-methylthio-o-phenylenediamine, 4-trifluoromethylthio-o-phenylenediamine, 4-chloro-o-phenylenediamine and 4-trifluoromethyl-o-phenylenediamine.

(D) When the methanolic solution of Part B of this example is replaced by any other alcohol, the corresponding acetates are produced, for example, ethyl-α-(5-fluoro-2-benzimidazolyl)acetate and t-butyl α-(5-nitro-2-benzimidazolyl)acetate.

EXAMPLE 2

Methyl α-[1-(p-chlorobenzoyl)-5-methyl-2-benzimidazolyl]acetate

A solution of methyl α-(5-methyl-2-benzimidazolyl) acetate (0.025 mole) in 125 ml. of methanol is stirred continuously while a solution of 0.025 mole of silver nitrate in 7.5 ml. of water and 10 ml. of concentrated ammonium hydroxide is added in small portions. The precipitate which forms is filtered and washed with methanol and ether and dried in vacuo. The product, the silver salt of the starting compound, is suspended in 100 ml. of dry xylene and distilled. A total of 40 ml. of distillate is collected, 0.025 mole of p-chlorobenzoyl chloride is added hereto and the mixture is refluxed for two hours. The mixture is filtered hot and the solid washed with xylene. The filtrate and washings are combined and concentrated to a small volume in vacuo, diluted with petroleum ether and filtered. The solid is dissolved in excess boiling ether and any undissolved material filtered off. The ether is concentrated at atmospheric pressure until crystallization begins. After standing overnight, the solid is filtered and petroleum ether added to the filtrate. After standing for six hours, the crystalline precipitate is filtered, washed with petroleum ether and dried, then crystallized twice from a 50:50 ether-petroleum ether mixture to give methyl α-[1-p-chlorobenzoyl)-5-methyl-2-benzimidazolyl]acetate (M.P., 117–118° C.).

Similarly, when other 2-benzimidazolyl esters are substituted in the above reaction in place of methyl α-(5-methyl - 2 - benzimidazolyl)acetate, the corresponding [1-(p-chlorobenzoyl)-2-benzimidazolyl] esters are produced, for example:

methyl α-[1-(p-chlorobenzoyl)-5-methoxy-2-benzimidazolyl]acetate;
isopropyl α-[1-(p-chlorobenzoyl)-5-fluoro-2-benzimidazolyl]acetate;
benzyl α-[1-(p-chlorobenzoyl)-5-nitro-2-benzimidazolyl]acetate;
t-butyl α-[1-(p-chlorobenzoyl)-5-phenyl-2-benzimidazolyl]acetate;
ethyl α-[1-(p-chlorobenzoyl)-5-chloro-2-benzimidazolyl]acetate.

EXAMPLE 3

The procedure of Example 2 is followed, using the following aroyl and heteroaroyl chlorides in place of p-chlorobenzoyl chloride to produce the corresponding N–1 aroyl and N–1 heteroaroyl derivatives of the 2-benzimidazolyl esters produced heretofore:

benzoyl chloride
p-methylthiobenzoyl chloride
3,4,5-trimethoxybenzoyl chloride
p-phenoxybenzoyl chloride
p-trifluoroacetylbenzoyl chloride
p-N-dimethylsulfamylbenzoyl chloride
3-furoyl chloride
1-methylimidazole-5-carboxylic acid chloride
1,3-dimethyl-2,3-dihydro-2-oxoimidazole-4-carboxylic acid chloride
1-methylbenzimidazole-2-carboxy chloride
5-fluoro-2-thenoyl chloride
5-nitro-2-furoyl chloride
1-methylindazole-3-carboxy chloride
5-methyl-4-oxazole carboxy chloride
oxazole-4-carboxy chloride
benzoxazole-2-carboxy chloride
thiazole-4-carboxy chloride
3-thenoyl chloride
1-methyl-6-nitroindazole-3-carboxy chloride
thiazole-2-carboxy chloride
2-phenylthiazole-4-carboxy chloride
2-benzylmercaptothiazole-4-carboxy chloride
nicotinoyl chloride
p-methylbenzoyl chloride
p-4-tolyloxybenzoyl chloride
p-4-methoxyphenoxybenzoyl chloride
p-4-chlorophenoxybenzoyl chloride
p-difluoroacetylbenzoyl chloride
p-monofluoroacetylbenzoyl chloride
p-4-methylbenzylthiobenzoyl chloride
p-4-chlorobenzylthiobenzoyl chloride
p-acetylbenzoyl chloride
N,N-dimethyl-p-carboxamidobenzoyl chloride
p-cyanobenzoyl chloride
p-carbomethoxybenzoyl chloride
p-formylbenzoyl chloride
p-trifluoromethylthiobenzoyl chloride
N,N-dimethyl-p-sulfonamidobenzoyl chloride
p-methylsulfinylbenzoyl chloride
p-methylsulfonylbenzoyl chloride
p-benzylthiobenzoyl chloride
p-nitrobenzoyl chloride
p-dimethylaminobenzoyl chloride
p-acetaminobenzoyl chloride
o-fluoro-p-chlorobenzoyl chloride
o-methoxy-p-chlorobenzoyl chloride
o-hydroxy-p-chlorobenzoyl chloride
2,4-5-trichlorobenzoyl chloride
3,4-methylenedioxybenzoyl chloride
p-ethoxybenzoyl chloride
p-bromobenzoyl chloride
p-fluorobenzoyl chloride

EXAMPLE 4

N-(p-chlorobenzyl)-4-methyl-o-phenylenediamine [1-(p-chlorobenzylamino)-2-amino-4-methylbenzene]

(A) N - (p-chlorobenzylidenyl)-2-nitro-p-toluidine: A mixture of 2-nitro-p-toluidine (0.02 mole) and p-chlorobenzaldehyde (0.02 mole) is heated on the steam-bath for two hours. The reaction mixture is then mixed with water, filtered, dried in vacuo and recrystallized from benzene to produce N-(p-chlorobenzylidenyl)-2-nitro-p-toluidine.

(B) N-(p-chlorobenzyl)-4-methyl-o-phenylenediamine: The produce of Part A (in 100 ml. of methanol) is hydrogenated at 25° C. and atmospheric pressure in the presence of 0.5 g. of a Raney nickel catalyst. After completion of the hydrogenation, the catalyst is filtered off and the solvent evaporated in vacuo to give a residue which crystallizes on standing. This residue is washed with petroleum ether and the solvert is removed in vacuo to give N-(p-chlorobenzyl)-4-methyl-o-phenylenediamine.

In like manner, when m-chlorobenzaldehyde and o-chlorobenzaldehyde are substituted for the para isomer in the process of this example, the corresponding N-substituted-o-phenylenediamines are produced.

(C) When the following aldehydes are substituted in the process of this example, the corresponding N–1 substituted o-phenylenediamine derivatives are produced:

pyridine-2-aldehyde
thiophene-2-aldehyde
pyrazine aldehyde
pyrrol-2-aldehyde
furfural
pyramidine-2-aldehyde
α-naphthaldehyde
benzothiazole-2-aldehyde
3-acetaminothiophene-2-aldehyde
furyl-2-aldehyde
1-methylpyrrol-2-aldehyde
thiazole-2-aldehyde
1-methylpyrazole-5-aldehyde
oxazole-4-aldehyde
5-styryl-6-ethoxyoxazole-2-aldehyde
1-methylpyridine-4-aldehyde
2-ethoxypyrane-3-aldehyde
1-phenylpyridazine-6-aldehyde
1-methylindole-3-aldehyde thionaphthene-3-aldehyde
benzofuran-5-aldehyde
5-chlorobenzofuran-3-aldehyde
1-methylbenzimidazole-2-aldehyde
7-azaindole-3-aldehyde
quinoline-8-aldehyde
isoquinoline-4-aldehyde
quinoxaline-2-aldehyde
β-naphthopyridine-2-aldehyde
benzoxazole-2-aldehyde

EXAMPLE 5

(A) N - (p - chlorobenzyl) - 4 - fluoro - o - nitraniline: A mixture of 0.033 mole of 4-fluoro-o-nitraniline, 0.035 mole of p-chlorobenzyl chloride, 3 grams of fused sodium acetate and 0.07 grams of iodine are heated at 120° C. for twelve hours. After cooling, the unreacted aniline compound is separated by trituration with concentrated hydrochloric acid and the solid, which is the crude N-(p-chlorobenzyl)-4-fluoro-o-nitraniline, is recrystallized from ethanol.

Similarly, the N-(p-chlorobenzyl) substituted compounds of the following known materials are prepared:

3-fluoro-o-nitraniline
5-fluoro-o-nitraniline
6-chloro-o-nitraniline
4-methoxy-o-nitraniline
5-methoxy-o-nitraniline
3-trifluoromethyl-o-nitraniline
4-trifluoromethyl-o-nitraniline
5-methyl-o-nitraniline
6-methyl-o-nitraniline
4-methyl-5-fluoro-o-nitraniline
4-methyl-5-methoxy-o-nitraniline
4-methoxy-5-chloro-o-nitraniline
3-methoxy-6-methyl-o-nitraniline
4-chloro-5-methyl-o-nitraniline
3-methyl-6-methoxy-o-nitraniline (B) By substituting the following aralkyl chlorides for p-chlorobenzyl chloride in the procedure of Part A, the corresponding N–1 aralkyl derivatives of the o-nitroaniline compounds listed above are prepared:

benzyl chloride
p-bromobenzyl chloride
2,4-dichlorobenzyl chloride
o-chlorobenzyl chloride
p-methylthiobenzyl chloride
p-fluorobenzyl chloride
p-methylbenzyl chloride
p-trifluoromethylbenzyl chloride
m-trifluoromethylbenzyl chloride
p-dimethylsulfamylbenzyl chloride
2-nitro-4-chlorobenzyl chloride
2-methoxy-4-chlorobenzyl chloride
2-nitro-4-methylbenzyl chloride
2-nitro-4-fluorobenzyl chloride
2-nitro-4-methoxybenzyl chloride
p-methoxybenzyl chloride
o-hydroxybenzyl chloride
4-hydroxy-3-methoxybenzyl chloride
3,4-methylenedioxybenzyl chloride
p-nitrobenzyl chloride
p-N,N-dimethylsulfamylbenzyl chloride

EXAMPLE 6

N-(p-chlorobenzyl)-4-fluoro-o-phenylenediamine[1-(p-chlorobenzylamino)-2-amino-4-fluorobenzene]

A total of 0.01 mole of N-(p-chlorobenzyl)-4-fluoro-o-nitraniline, in 100 ml. of methanol, is reduced with hydrogen in the presence of 0.5 g. of Raney nickel catalyst. After completion of the reaction, the catalyst is removed by filtration and the filtrate is evaporated in vacuo to yield a residue which is washed with petroleum and dried in vacuo to produce N - (p - chlorobenzyl) - 4 - fluoro-o-phenylenediamine.

In like manner, any other N–1 substituted-o-nitraniline synthesized heretofore may be substituted in the above reaction to produce the corresponding N–1 substituted-o-diamine, for example:

N-(p-trifluoromethylbenzyl)-4-methyl-5-fluoro-o-phenylenediamine[1-(p-trifluoromethylbenzylamino)-2-amino-4-methyl-5-fluorobenzene];
N-(p-methoxybenzyl)3-methyl-6-methoxy-o-phenylenediamine[1-(p-methoxybenzylamino)-2-amino-3-methyl-6-methoxybenzene].

And similarly, the diamines of the following known nitro compounds are prepared by substituting each in the procedure of this example:

N-benzyl-2-nitro-4-chloroaniline
N-benzyl-2-nitro-5-chloroaniline
N-benzyl-2-nitro-4-methylaniline
N-benzyl-2-nitro-4,5-dichloroaniline
N-benzyl-3-chloro-6-nitro-o-toluidine

EXAMPLE 7

N-(p-chlorobenzyl)-4-nitro-o-phenylenediamine[1-(p-chlorobenzylamino)-2-amino-4-nitrobenzene]

(A) N-(p-chlorobenzyl)-2,4-dinitroaniline: A mixture of 0.005 mole of phenyl-2,4-dinitrophenylsulfone, 0.01 mole of p-chlorobenzylamine and 10 ml. of absolute ethanol is heated at 140–150° C. for two hours. On cooling the mixture, a precipitate of N-(p-chlorobenzyl)-2,4-dinitroaniline separates which is filtered and dried in vacuo.

(B) N-(p-chlorobenzyl)-4-nitro-o-phenylenediamine: A total of 0.003 mole of the product of Part A in 10 ml. of hot ethanol has 20 ml. of 24% ammonia added thereto. Hydrogen sulfide is bubbled in to saturate the solution and the mixture is heated for an hour on the steam-bath. The solution is then diluted and the resulting precipitate is filtered off and extracted thoroughly with warm 5% hydrochloric acid. The combined extracts are made alkaline with dilute ammonium hydroxide and the precipitate which separates is filtered and dried in vacuo to produce N-(p-chlorobenzyl)-4-nitro-o-phenylenediamine.

Similarly, any nitro group ortho to the amino or substituted amino group of an aniline compound can be reduced to the corresponding amino radical.

EXAMPLE 8

α-[1-(p-chlorobenzyl)-5-methyl-2-benzimidazolyl]acetic acid (A) Methyl α-[1-(p-chlorobenzyl)-5-methyl-2-benzimidazoyl]acetate: A mixture of 0.06 mole of N-(p-chlorobenzyl)-4-methyl-o-phenylenediamine and 0.16 mole ethyl cyano-acetate is refluxed for two hours, cooled to room temperature and left overnight. Ether (50 ml.) is added and the precipitate washed with more ether. A total of 150 ml. of methanol and 60 ml. of hydrochloric acid are added to the solid and the mixture is refluxed for six hours. After cooling to room temperature, the reaction mixture is diluted with 100 ml. of water and made alkaline with ammonium hydroxide. The alcohol is removed in vacuo and the mixture is then extracted with three 50 ml. portions of chloroform. The extract is dried with sodium carbonate and evaporated to dryness and the residue is recrystallized from ethyl acetate to yield a product with a melting point of 89–91° C., methyl α-[1-(p-chlorobenzyl)-5-methyl-2-benzimidazolyl]acetate.

(B) α - [1 - (p-chlorobenzyl)-5-methyl-2-benzimidazolyl]acetic acid: The ester of Part A (0.02 mole) is refluxed for 2.5 hours with 0.02 mole ethanolic sodium hydroxide. Then the reaction mixture is diluted with 100 ml. of water and neutralized with acetic acid. The gelatinous precipitate is filtered, washed with water and air-dried to give α - [1-(p-chlorobenzyl)-5-methyl-2-benzimidazolyl]acetic acid.

EXAMPLE 9

(A) α-[1-(p-chlorobenzyl)-5-dimethylamino-2-benzimidazolyl]-acetic acid: A total of 0.01 mole of α-[1-(p-chlorobenzyl)-5-nitro-2-benzimidazolyl]acetic acid in 150 ml. of freshly distilled dimethoxyethane, 15 ml. of glacial acetic acid, and 5 ml. of 37% aqueous formaldehyde is reduced in a 40 p.s.i. hydrogen atmosphere at room temperature, in the presence of about 4 grams of Raney nickel catalyst. After the theoretical amount of hydrogen has been taken up, the catalyst is filtered off and the filtrate is evaporated in vacuo. The residue is chromatographed on a thin layer of silica gel on glass plates, using a mixture of benzene-ethyl acetate as eluent and the desired band is then scraped off and extracted with ethyl acetate. Evaporation of the solvent in vacuo yields α-[1-(p-chlorobenzyl)-5-dimethylamino-2-benzimidazoyl]acetic acid.

(B) α - [1 - (p - chlorobenzyl)-5-amino-2-benzimidazolyl]acetic acid: 0.02 mole of α-[1-(p-chlorobenzyl)-5-nitro-2-benzimidazolyl]acetic acid in 100 ml. of dimethoxyethane is hydrogenated at 25° C. and atmosphere pressure in the presence of 1 g. of a 10% palladium-on-charcoal catalyst. After completion of the hydrogenation, the catalyst is filtered off and the solvent evaporated in vacuo to yield α-[1-(p-chlorobenzyl)-5-amino-2-benzimidazolyl]acetic acid.

(C) A mixture of 0.01 mole of α-[1-(p-chlorobenzyl)-5-amino-2-benzimidazolyl]acetic acid, 0.011 mole of methyl iodide, 0.015 mole of sodium bicarbonate and 50 ml. of anhydrous 1,2-dimethoxyethane are heated on a steam-bath under nitrogen for three hours. The solution is filtered and the solvent removed in vacuo to yield a crude product which is chromatographed to give α-[1-(p-chlorobenzyl)-5-methylamino-2-benzimidazolyl]acetic acid.

(D) When other compounds of the invention are substituted in the above procedures, the corresponding amino or substituted amino products are prepared, for example: methyl α - [1-(4'-thiazolylmethyl)-4-methoxy-5-amino-2-benzimidazolyl]acetate.

EXAMPLE 10

(A) Methyl α-[1-(p-chlorobenzoyl)-5-(1-pyrrolidino)-2-benzimidazolyl]acetate: A mixture of 0.01 mole of methyl α-[1-(p-chlorobenzoyl)-5-amino-2-benzimidazolyl]acetate, 1 g. of 1,4-dibromobutane and 0.975 g. of anhydrous sodium carbonate in 80 ml. of ethanol is stirred at reflux for six hours, under nitrogen. The reaction mixture is then filtered and the filtrate concentrated in vacuo to a small volume and diluted with ether. The solution is washed twice with water, dried in anhydrous sodium sulfate and concentrated in vacuo to dryness to produce methyl α-[1-(p-chlorobenzoyl)-5-(1-pyrrolidino)-2-benzimidazolyl]-acetate.

When ethylene dibromide is used instead of dibromobutane, the product obtained is the 5-(1-aza-cyclopropyl)benzimidazole.

(B) Methyl α-[1-(p-chlorobenzoyl)-5-bis(β-hydroxyethyl)-amino-2-benzimidazolyl]acetate: A mixture of 0.02 mole of methyl α-[1-(p-chlorobenzoyl)-5-amino-2-benzimidazolyl]acetate, 0.044 mole of ethylene oxide and 0.03 mole of acetic acid in 300 ml. of dimethoxyethane is heated to 50° C. in an autoclave for 18 hours. The mixture is then diluted with water and filtered to yield methyl α - [1-(p-chlorobenzoyl)-5-bis(β-hydroxyethyl) amino-2-benzimidazolyl]acetate.

When an equivalent amount of propylene oxide is used in the procedure of this part in place of ethylene oxide, there is obtained the 5-bis(β-hydroxypropyl)-amino homologue.

(C) Methyl α - [1 - (p-chlorobenzoyl)-5-(4-methyl-1-piperazinyl - 2 - benzimidazolyl]acetate: The product of Part B is stirred with 2 mole proportions of p-toluenesulfonyl chloride in pyridine until the reaction is substantially complete. The mixture is then poured into water and the 5-bis(p-toluene-sulfonyloxyethyl)amino compound is isolated and dissolved in benzene. One mole of methylamine is added and the mixture is allowed to stand at room temperature for three days, then poured into iced water containing two equivalents of sodium carbonate and immediately extracted with ether. Evaporation of the ether yields methyl α - [1 - (p-chlorobenzoyl)-5-(4-methyl-1-piperazinyl)-2-benzimidazolyl]acetate.

(D) Methyl α - [1 - (p-chlorobenzoyl)-5-(4-morpholinyl)-2-benzimidazolyl]acetate: A solution of tosyl chloride (0.1 mole) in 200 ml. benzene is added dropwise, with stirring, to a solution of 0.1 mole of methyl α-[1-(p-chlorobenzoyl) - 5 - bis(β-hydroxyethyl)-amino-2-benzimidazolyl]acetate and 0.3 mole of pyridine in 300 ml. of benzene. The addition is made at room temperature over a period of one hour and then the mixture is heated at reflux for three hours, then washed with water, dried over sodium sulfate and the solvent evaporated to yield methyl α-[1-p-chlorobenzoyl)-5-(4-morpholinyl)-2-benzimidazolyl]acetate.

(E) The procedures of this example are employed using other 5-amino compounds of the invention to produce the corresponding 5-substituted benzimidazole esters, for example:

allyl α-[1-(thiazoloyl-2)-5-bis(β-hydroxypropyl)-amino-2-benzimidazolyl]acetate;
cyclopentyl α-[1-(benzoxazole-2-carbonyl)-5-dimethylamino-2-benzimidazolyl]acetate;
benzyl α-[1-(p-methoxybenzyl)-5-(4-methyl-1-piperazinyl)-2-benzimidazolyl]acetate.

EXAMPLE 11

α-[1-(p-chlorobenzoyl)-5-methyl-2-benzimidazolyl]acetic acid

A mixture of 0.005 mole of t-butyl α-[1-(p-chlorobenzoyl)-5-methyl-2-benzimidazolyl]acetate and about 1 g. of fine porous-plate chips is heated slowly in an oil bath, under nitrogen, until isobutylene starts to escape. Stirring is initiated and the temperature held constant for about one hour. On cooling, the residue is extracted with saturated sodium bicarbonate solution, filtered, the aqueous solution washed with 100 ml. ether, made neutral with 1 N hydrochloric acid and lyophilized to give α-[1-(p-chlorobenzoyl) - 5 - methyl - 2-benzimidazolyl]-acetic acid.

Similar treatment of any other t-butyl ester will yield the corresponding free acid, for example: α-[1-(p-acetylbenzoyl) - 5 - (1-pyrrolidno) - 2-benzimidazoyl]acetic acid is produced by the treatment of its t-butyl ester according to this procedure.

EXAMPLE 12

(A) Sodium α - [1 - (p-chlorobenzoyl-5-methyl-2-benzimidazolyl]acetate: A mixture of 0.001 mole of α-[1-(p-chlorobenzoyl) - 5 - methyl-2- benzimidazolyl]acetic acid and 0.001 mole of sodium hydroxide in 100 ml. of water is stirred until solution is complete and then filtered. The filtrate is evaporated in vacuo to give sodium α-[1-(p-chlorobenzoyl)-5-methyl-2-benzimidazolyl]acetate.

Similarly there may be prepared the calcium and aluminum salts as well as other salts such as potassium, iron and magnesium of the benzimidazolyl acids described in the previous examples, such as:

calcium α-[1-(p-methylsulfamylbenzyl)-5-dimethylsulfamyl-2-benzimidazolyl]acetate;
potassium α-[1-(p-methylsulfinylbenzoyl)-5-methoxy-2-benzimidazolyl]acetate.

(B) To a solution of 0.01 mole of α-[1-(p-chlorobenzoyl)-5-methyl-2-benzimidazolyl]acetic acid in 100 ml. of ether at 0° C. is added a solution of 0.01 mole of morpholine in 50 ml. of ether, dropwise, with stirring. The mixture is filtered and the solution is dried in vacuo to yield the morpholine salt of α-[1-(p-chlorobenzoyl)-5-methyl-2-benzimidazoyl]acetic acid.

In a similar fashion, other salts of organic bases are prepared by substituting them for morpholine in the reaction of this part, for example, triethylamine, ethanolamine, choline, butylamine, 2,3-xylidine and piperazine.

EXAMPLE 13

(A) N - methyl - α - [1-(p-chlorobenzyl)-5-methyl-2-benzimidazolyl]acetamide: A mixture of 0.01 mole of methyl α-[1-(p-chlorobenzyl)-5-methyl-2-benzimidazolyl] acetate and 6 ml. of 33% alcoholic methylamine is heated in a sealed tube at 125° C. for twelve hours. The mixture is evaporated in vacuo and the residue is N-methyl-α-[1-(p-chlorobenzyl)-5-methyl-2-benzimidazolyl]acetamide.

(B) Utilizing the procedure of Part A, but substituting an equivalent quantity of morpholine, ethanolamine, benzylamine, piperidine, substituted piperidine, pyrrolidine, substituted pyrrolidine, piperazine, substituted piperazine, aniline, substituted aniline, phenethylamine, substituted phenethylamine, cyclohexylamine, lower alkyl amines, glucosamine, substituted glucosamine, tetrahydrofurfurylamine or β-methoxyethylamine, in place of methylamine, the corresponding amides are formed. A primary amide is produced when methylamine is replaced by ammonia.

(C) N,N - diethyl - α-[1-(p-chlorobenzyl)-5-methyl-2-benzimidazolyl]acetamide: To a mixture of 0.01 mole of α - [1-(p-chlorobenzyl)-5-methyl-2-benzimidazolyl]acetic acid, 0.011 mole of triethylamine and 0.011 mole of isobutyl chloroformate in 100 ml. dimethoxyethane is added 0.011 mole of diethylamine, with cooling. The mixture is stirred at 0° C. for one hour at room temperature for another two hours. The mixture is concentrated in vacuo to 30 ml. and is poured into water to give N,N-diethyl-α-[1 - (p-chlorobenzyl) - 5 - methyl - 2 - benzimidazolyl] acetamide.

When other di(lower alkyl)amines are substituted for diethylamine in the procedure of this part, the corresponding amides are produced, for example:

N,N-dipropyl-α-[1-(p-methylthiobenzyl)-5-morpholino-2-benzimidazolyl]acetamide;
N,N-diisobutyl-α-[1-(2-benzylmercaptothiazole-4-carbonyl)-5-cyclobutylmethoxy-2-benzimidazolyl] acetamide.

EXAMPLE 14

(A) α-[1-(p-chlorobenzoyl)-5 - methyl - 2 - benzimidazolyl]acetic anhydride: Dicyclohexylcarbodiimide (0.049 M) is dissolved in a solution of 0.1 M of α-[1-(p-chlorobenzoyl)-5-methyl-2-benzimidazolyl]acetic acid in 200 ml. of tetrahydrofuran, and the solution is allowed to stand at room temperature for two hours. The precipitated urea is removed by filtration and the filtrate is evaporated in vacuo to yield the desired anhydride.

(B) Isobutyl α-[1-(p-chlorobenzoyl)-5-methyl-2-benzimidazolyl]acetic anhydride (mixed anhydride): A solution of 0.01 mole of α-[1-(p-chlorobenzoyl)-5-methyl-2-benzimidazolyl]acetic acid in 100 ml. dimethoxyethane is treated with 0.01 mole of triethylamine with ice-cooling and stirring. After one hour, 0.011 mole of isobutyl chloroformate is added dropwise and the mixture stirred for four to eight hours at 0° to 5° C. The solution is filtered to remove precipitated triethylamine hydrochloride and evaporated in vacuo to give a concentrated solution of the mixed anhydride.

In like manner, using equivalent quantities of ethyl chloroformate, propyl chloroformate, phenyl chloroformate, p-nitrophenyl chloroformate and methyl chloroformate in the procedure of this part in place of isobutyl chloroformate, the corresponding mixed anhydrides are produced.

(C) When an equivalent quantity of any benzimidazolyl acid prepared heretofore is used in the procedures of this example, the corresponding symmetrical or mixed anhydride is produced, provided no replaceable hydrogen is present.

EXAMPLE 15

α-[1-(p-chlorobenzyl)-5-allyloxy-2-benzimidazolyl]acetic acid (A) α-[1-(p-chlorobenzyl)-5-hydroxy - 2 - benzimidazolyl]acetic acid: One gram of α-[1-(p-chlorobenzyl)-5-methoxy-2-benzimidazolyl]acetic acid and ten grams of dry pyridine hydrochloride are heated at 180° C. for ten minutes. The reaction mixture is then cooled, diluted with water, filtered and washed with 100 ml. of water to produce α - [1-(p-chlorobenzyl)-5-hydroxy-2-benzimidazolyl]acetic acid.

When other methoxy-containing compounds are used in the procedure of this part, the corresponding hydroxy compounds are produced, for example:

α-(1-benzyl-4-hydroxy-2-benzimidazolyl)acetic acid.

(B) α-[1 - (p-chlorobenzyl)-5-allyloxy-2-benzimidazolyl]acetic acid: A mixture of 0.1 mole of the product of Part A, 100 ml. dimethoxyethane, 300 ml. of 2.5 N sodium hydroxide and 0.15 mole of allyl chloride is stirred vigorously at room temperature for 2–4 hours. The mixture is then extracted with ether and the aqueous layer is acidified to give the desired 5-allyloxy compound.

When cyclopentyl bromide is used in place of the allyl halide in this reaction, the corresponding 5-cyclopentyloxy compound is obtained.

EXAMPLE 16

α-[1-(p-chlorobenzoyl)-5-dimethylamino-2-benzimidazolyl]acetic acid (A) 5-nitro-2-cyanomethylbenzimidazole: A mixture of 0.1 mole of 4-nitro-o-phenylenediamine and 0.15 mole of ethyl cyanoacetate is refluxed for two hours and cooled slowly to room temperature. Ether is added to the mixture and the solid is filtered and washed with additional ether to yield 5-nitro-2-cyanomethylbenzimidazole.

(B) t-Butyl α - (5-nitro-2-benzimidazolyl)acetate: 0.03 mole of the product of Part A is added to 100 ml. of a 5% t-butanolic hydrogen chloride solution and the mixture is refluxed for two hours, filtered, and evaporated in vacuo. The residue is then distributed between 50 ml. of a 10% sodium bicarbonate solution and 50 ml. of chloroform, and the chloroform layer is dried with anhydrous sodium bicarbonate and evaporated to dryness in vacuo to obtain t-butyl α - (5-nitro-2-benzimidazolyl)acetate.

(C) t-Butyl α-[1-(p-chlorobenzoyl)-5-nitro-2-benzimidazolyl]acetate: A solution of the t-butyl α-(5-nitro-2-benzimidazolyl)acetate (0.025 mole) in 125 ml. of methanol is stirred continuously while a solution of 0.025 mole of silver nitrate in 7.5 ml. of water and 10 ml. of concentrated ammonium hydroxide is added in small portions. The precipitate which forms is filtered and washed with methanol and ether and dried in vacuo. The product, the silver salt of the starting compound, is suspended in 100 ml. of dry xylene and distilled. A total of 40 ml. of distillate is collected, 0.025 mole of p-chlorobenzoyl chloride is added hereto and the mixture is refluxed for two hours. The mixture is filtered hot and the solid washed with xylene. The filtrate and washings are combined and concentrated to a small volume in vacuo, diluted with petroleum ether and filtered. The solid is dissolved in excess boiling ether and any undissolved material filtered off. The ether is concentrated at atmospheric pressure until crystallization begins. After standing overnight, the solid is filtered and petroleum ether added to the filtrate. After standing for six hours, the crystalline precipitate is filtered, washed with petroleum ether and dried, then crystallized twice from a 50:50 ether-petroleum ether mixture to give t-butyl α-[1-(p-chlorobenzoyl)-5-nitro-2-benzimidazolyl]acetate.

(D) α-[1 - (p-chorobenzoyl) - 5 - nitro-2-benzimidazolyl]-acetic acid: A mixture of 0.015 mole of t-butyl α-[1-(p-chlorobenzoyl)-5-nitro - 2 - benzimidazolyl]acetate and about 3 g. of fine porous-plate chips is heated slowly in an oil bath, under nitrogen, until isobutylene starts to escape. Stirring is initiated and the temperature held constant for about one hour. On cooling, the residue is extracted with saturated sodium bicarbonate solution, filtered, the aqueous solution washed with 300 ml. ether, made neutral with 1 N hydrochloric acid and lyophilized to give α-[1-(p-chlorobenzoyl)-5-nitro - 2 - benzimidazolyl]acetic acid.

(E) α-[1 - (p-chlorobenzoyl) - 5 - dimethylamino-2-benzimidazolyl]acetic acid: A total of 0.005 mole of α-[1-(p-chlorobenzoyl) - 5 - nitro-2-benzimidazolyl]acetic acid in 75 ml. of freshly distilled dimethoxyethane, 7.5 ml. of glacial acetic acid and 2.5 ml. of 37% aqueous formaldehyde is reduced in a 40 p.s.i. hydrogen atmosphere at room temperature, in the presence of about 2 grams of Raney nickel catalyst. After the theoretical amount of hydrogen has been taken up, the catalyst is filtered off and the filtrate is evaporated in vacuo. The residue is chromatographed on a thin layer of silica gel on glass plates, using a mixture of benzene-ethyl acetate as eluent and the desired band is then extracted with ethyl acetate. Evaporation of the solvent in vacuo yields α-[(p-chlorobenzoyl)-5-dimethylamino-2-benzimidazolyl]acetic acid.

EXAMPLE 17

β-Diethylaminoethyl α-[1-(p-chlorobenzyl)-5-methoxy-2-benzimidazolyl]acetate (A) N-(p-chlorobenzylidenyl)-2-nitro - p-anisidine: A mixture of 2-nitro-p-anisidine (0.2 mole) and p-chlorobenzaldehyde (0.2 mole) is heated on the steam bath for two hours. The reaction mixture is then mixed with water, filtered, dried in vacuo and recrystallized from benzene to produce N-(p-chlorobenzylidenyl)-2-nitro-p-anisidine.

(B) N - (p - chlorobenzyl)-4-methoxy-o-phenylenediamine: The product of Part A (in 1000 ml. of methanol) is hydrogenated at 25° C. and atmospheric pressure in the presence of 5.0 g. of a Raney nickel catalyst. After completion of the hydrogenation, the catalyst is filtered off and the solvent evaporated in vacuo to give a residue which crystallizes on standing. This residue is washed with petroleum ether and the solvent is removed in vacuo to give N-(p-chlorobenzyl)-4-methoxy-o-phenylenediamine.

(C) β - Diethylaminoethyl α - [1-(p-chlorobenzyl)-5-methoxy-2-benzimidazolyl]acetate: A mixture of 0.06 mole of N - (p-chlorobenzyl)-4-methoxy-o-phenylenediamine and 0.16 mole ethyl cyanoacetate is refluxed for two hours, cooled to room temperature and left overnight. Ether (50 ml.) is added and the precipitate washed with more ether. A total of 150 ml. of β-diethylaminoethanol and 60 ml. of hydrochloric acid are added to the solid and the mixture is refluxed for six hours. After cooling to room temperature, the reaction mixture is diluted with 100 ml. of water and made alkaline with ammonium hydroxide. The alcohol is removed in vacuo and the mixture is then extracted with three 50 ml. portions of chloroform. The extract is dried with sodium carbonate and evaporated to dryness. The residue is chromatographed on acid-washed alumina using 1:1 ether-hexane as the solvent and the desired band is scraped off and extracted with ethyl acetate to yield β - diethylamino-ethyl α-[1-(p-chlorobenzyl)-5-methoxy-2-benzimidazolyl]-acetate.

EXAMPLE 18

α-[1-(p-methylsulfinylbenzoyl)-5-methoxy-2-benzimidazolyl]acetic acid (A) t-Butyl α - (5-methoxy-2-benzimidazolyl)acetate: A mixture of 4-methoxy-o-phenylenediamine (0.1 mole) and 0.15 mole of ethyl cyanoacetate is refluxed for 2 hours and cooled to room temperature overnight. Ether is added to the mixture and the solid is filtered and washed with more ether to yield 5-methoxy-2-(a-cyanomethyl)benzimidazole. This product (0.03 mole) is added to 75 ml. of a 9% t-butanolic hydrogen chloride solution and the mixture is refluxed 2 hours, filtered and evaporated in vacuo. The residue is distributed between 50 ml. of a 10% sodium bicarbonate solution and 50 ml. of chloroform, the chloroform layer is dried with solid anhydrous sodium carbonate and evaporated to dryness in vacuo to produce t-butyl α-(5-methoxy-2-benzimidazolyl)acetate.

(B) t-Butyl α-[1-(p-methylsulfinylbenzoyl) - 5 - methoxy-2-benzimidazolyl]acetate: A solution of t-butyl α-(5-methoxy-2-benzimidazolyl) acetate (0.025 mole) in 125 ml. of methanol is stirred continuously while a solution of 0.025 mole of silver nitrate in 7.5 ml. of water and 10 ml. of concentrated ammonium hydroxide is added in small portions. The precipitate which forms is filtered and washed with methanol and ether and dried in vacuo. The product, the silver salt of the starting compound, is suspended in 100 ml. of dry xylene and distilled. A total of 40 ml. of distillate is collected, 0.025 mole of p-methylsulfinyl chloride is added hereto and the mixture is refluxed for 2 hours. The mixture is filtered hot and the solid washed with xylene. The filtrate and washings are combined and concentrated to a small volume in vacuo, diluted with petroleum ether and filtered. The solid is dissolved in excess boiling ether and any undissolved material filtered off. The ether is concentrated at atmospheric pressure until crystallization begins. After standing overnight, the solid is filtered and petroleum ether is added to the filtrate. After standing for six hours, the crystalline precipitate is filtered, washed with petroleum ether and dried, then crystallized twice from a 50:50 ether-petroleum ether mixture to give t-butyl α-[1-(p-methylsulfinylbenzoyl)-5-methoxy-2-benzimidazolyl]acetate.

(C) α-[1-(p-methylsulfinylbenzoyl)-5-methoxy-2-benzimidazolyl]acetic acid: A mixture of 0.005 mole of t-butyl α-[1-(p-methylsulfinyl)-5-methoxy - 2 - benzimidazolyl] acetate and about 1 g. of fine porous-plate chips is heated slowly in an oil bath, under nitrogen, until isobutylene starts to escape. Stirring is initiated and the temperature held constant for about one hour. On cooling, the residue is extracted with saturated sodium bicarbonate solution, filtered, the aqueous solution washed with 100 ml. ether, made neutral with 1 N hydrochloric acid and lyophilized to give α-[1-(p-methylsulfinylbenzoyl)-5-methoxy-2-benzimidazolyl]acetic acid.

What is claimed is:

1. A compound of the formula

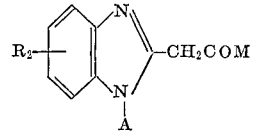

in which

A is benzoyl, or substituted benzoyl wherein the substituents are lower alkylthio, lower alkoxy, phenoxy, trifluoroacetyl, di(lower alkyl)sulfamyl, lower alkyl, tolyloxy, lower alkoxyphenoxy, halophenoxy, difluoroacetyl, monofluoroacetyl, lower alkylbenzylthio, halobenzylthio, acetyl, di(lower alkyl)carboxamido, cyano, carbomethoxy, formyl, trifluoromethylthio, di(lower alkyl)-sulfonamido, lower alkylsulfinyl, lower alkylsulfonyl, benzylthio, nitro, di(lower alkyl)amino, acetamino, halo, hydroxy, or methylenedioxy;

$R_2$ is on the 5- or 6-position of the benzimidazole ring and is hydrogen, lower alkyl, lower alkoxy, nitro, amino, bis(hydroxy lower alkyl)amino, 1-pyrrolidino, 4-methyl-1-piperazinyl, 4-morpholinyl, halogen, 1-azacyclopropyl, phenyl, or di(lower alkyl)amino; and M is hydroxy, benzyloxy, lower alkoxy, β-dimethylaminoethoxy, β-acetaminoethoxy, allyloxy, or OZ, where Z is a cation of an alkali or alkaline earth metal.

2. A compound according to claim 1 where A is p-halobenzoyl; M is hydroxy, lower alkoxy, or benzyloxy; $R_2$ is lower alkoxy, halo, nitro or di(lower alkyl)amino.

3. α-[1-(p-chlorobenzoyl)-5-dimethylamino-2-benzimidazolyl]acetic acid.

4. α-[1-(p-chlorobenzoyl) - 5-methyl-2-benzimidazolyl]acetic acid.

5. α-[1-(p-methylsulfinylbenzoyl)-5-methoxy-2-benzimidazolyl]acetic acid.

References Cited

Ganellin et al.: J. Heterocyclic Chem., vol. 3, pp. 278–81 (September 1966).

Magistretti: Chem. Abst., vol. 50, column 10210 (1956).

Takahashi et al.: Chem. Abst., vol. 52, column 6473 (1965).

NATALIE TROUSOF, Primary Examiner

U.S. Cl. X.R.

260—210, 211, 211.5, 239, 240, 247.1, 247.2, 247.5, 250, 256.4, 256.5, 268, 269, 287, 288, 291, 293, 293.4, 294, 294.3, 294.7, 294.8, 295, 296, 304, 306, 306.8, 307, 308, 310, 313.1, 326.15, 326.85, 329, 345.1, 346.2, 347.7, 465, 544, 562, 566, 571, 576, 999